US005525187A

United States Patent [19]

Pascal et al.

[11] Patent Number: 5,525,187

[45] Date of Patent: Jun. 11, 1996

[54] POG PRESS

[76] Inventors: David G. Pascal, 3451 Primera Ave., Los Angeles, Calif. 90068; Alton J. Nakama, 4907 Collis Ave., Los Angeles, Calif. 90032

[21] Appl. No.: 273,183

[22] Filed: Jul. 11, 1994

[51] Int. Cl.$^{6}$ .................................................. B32B 31/18

[52] U.S. Cl. ............................ 156/515; 83/684; 156/261; 156/580; 156/581; 156/530

[58] Field of Search ............................ 83/684, 685, 686, 83/597; 156/261, 262, 515, 518, 580, 581, 520, 530

[56] References Cited

U.S. PATENT DOCUMENTS

| | | | |
|---|---|---|---|
| 685,212 | 10/1901 | Knowlton | 83/597 |
| 4,145,244 | 5/1979 | Covey | 156/240 X |
| 4,172,003 | 10/1979 | Bachelder et al. | 156/517 |
| 4,528,882 | 7/1985 | Axford et al. | 83/684 X |
| 4,863,551 | 9/1989 | Ogura | 156/261 X |

FOREIGN PATENT DOCUMENTS

| | | | |
|---|---|---|---|
| 1296337 | 5/1969 | Germany | 156/261 |
| 506187 | 12/1954 | Italy | 83/597 |
| 8707201 | 12/1987 | WIPO | 83/685 |

*Primary Examiner*—David A. Simmons
*Assistant Examiner*—Steven J. Helmer
*Attorney, Agent, or Firm*—Jack C. Munro

[57] ABSTRACT

A pog press which utilizes a base and a lid with the lid being movable relative to the base. Mounted within the base is a pog receiving pocket with a pog pocket being mounted within the lid. The pog pocket and the pog receiving chamber are to interconnect when the lid is closed on the base. A sheet material pattern is to be connectable with the pog pocket and when the lid is closed on the base, a cutting blade severs the sheet material pattern with the severed segment to then conform to the shape of the pog pocket. The lid includes a transparent window over the transparent pocket to permit visualization of the interior of the pog receiving chamber when the lid is in the closed position with the base.

4 Claims, 1 Drawing Sheet

POG PRESS

BACKGROUND OF THE INVENTION

1) Field of the Invention

The field of this invention has to do with manufacturing of toy articles, and more particularly to a press that is to be utilized by a human, normally a child, to manufacture individual pogs.

2) Description of the Prior Art

Within recent years there has evolved a new line of collectible articles. These articles, known as pogs, constitute circular cardboard disks that includes an exterior printed surface. These circular cardboard disks were originally patterned after milk bottle caps. These circular cardboard disks are printed with a variety of designs to inspire the collection of these pogs.

Games have been created using pogs. A typical game may be compared to marble games that were commonly played decades ago. One game stacks the disks in an upside down manner like chips and then a slammer, which is a pog-sized disk made of plastic or metal, is then thrown down upon the stack. Any pogs that are overturned from the stack to reveal its printed image are then collected by the player who threw down the slammer. The remaining upside down pogs are stacked again and the game continues until all pogs have been overturned and collected.

Currently there are many different pogs available with each bearing a wide variety of licensed properties printed on them. A typical example of licensed properties would be sports players, superheros from comic books and the like. Comic bookstores display pogs next to trading cards and pogs are available individually or in sets.

SUMMARY OF THE INVENTION

The pog press of the present invention allows a collector to create his or her own individual custom pogs through magazine pictures, comic books, as well as individual creations that are printed on a sheet of paper. The pog press will normally be constructed of plastic and formed of a base and a lid, with the lid being pivotally connected to the base. The lid is pivotal from a closed position in juxtaposition with the base to an open position located at a ninety degree spaced relationship relative to the base. Within the base is a pog receiving chamber and this pog receiving chamber is normally circular and includes a bottom resilient surface that is slightly compressible. A blank pog is to be located within the pog receiving chamber with this blank pog including an adhesive layer which is covered by a release paper. The release paper is removed. Within the lid is a pog receiving pocket, with this pocket being encircled by a cutting edge. Also incorporated with the lid is a pattern receiving slot with a sheet material paper pattern to be connectable with the slot covering the pog receiving pocket. The upper surface of this pattern incorporates the image that is to be connected to the pog. The exterior surface of the pog receiving pocket is transparent, constructed either of plastic or glass. The lid is to be moved to the closed position with the cutting blade nesting within the pog receiving pocket with this cutting blade severing the pattern about the periphery of the pog. Further pressing together force between the lid and the base will press the severed pattern onto the adhesive surface of the pog producing the custom made pog. The lid is then moved to the open position and now the finished custom made pog is then to be removed from the pog press.

The primary objective of the present invention is to construct a press that permits individual manufacture of pogs rather than being solely dependent upon commercially manufactured pogs.

Another objective of the present invention is that the pog press is of a compact size and can easily fit within one's pocket.

Another objective of the present invention is to construct a pog press that can be manufactured at a relatively inexpensive price and therefore sold to the ultimate consumer at a relatively inexpensive price.

DETAILED DESCRIPTION OF THE SHOWN EMBODIMENT

Figure 2:
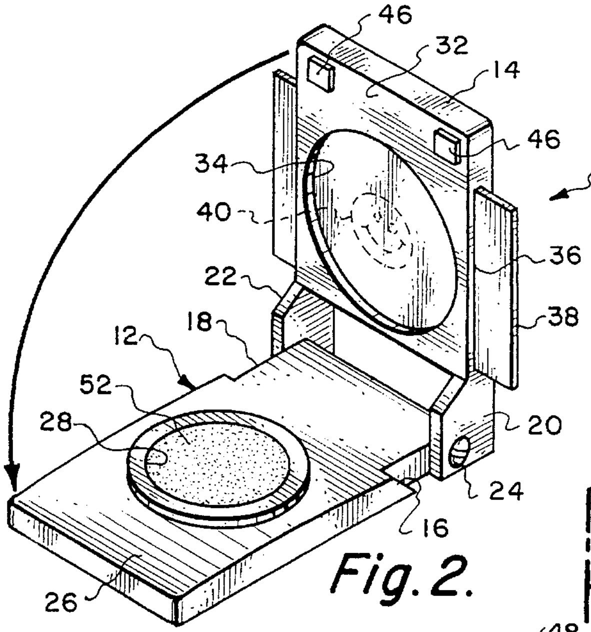
FIG. 2 is a view similar to FIG. 1 but showing the blank pog installed within the pog receiving chamber and the sheet material pattern installed in conjunction with the pog pocket of the lid.
Figure 3:
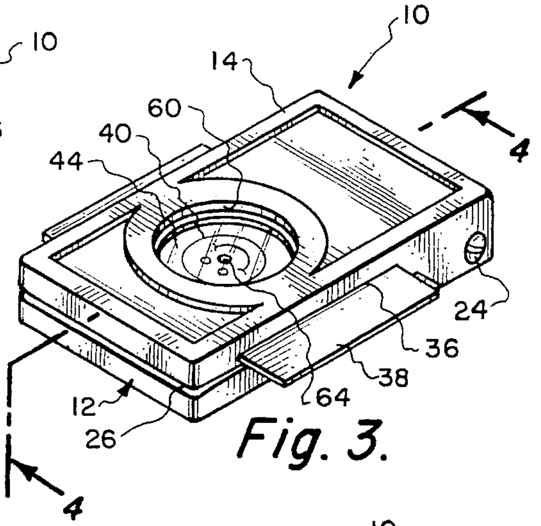
FIG. 3 is an isometric view of the pog press of the present invention showing the pog press in the closed position.
Figure 4:
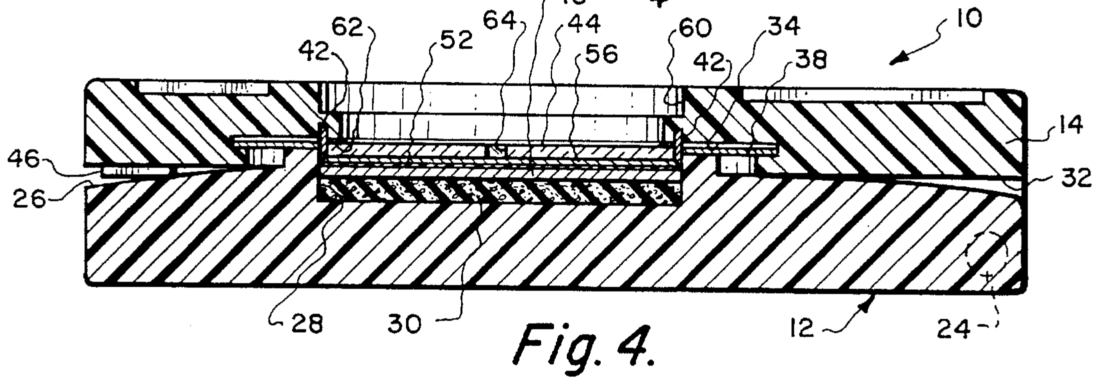
FIG. 4 is a cross-sectional view taken along line 4—4 of FIG. 3.

Referring particularly to the drawing, there is shown the pog press 10 of this invention which is formed basically of a base 12 and a lid 14. The upper end of the base 12 includes a pair of notches 16 and 18, a side rail 20 of lid 14 connects with notch 16 and side rail 22 of lid 14 connects with notch 18. A pivot pin 24 connects between the side rails 20 and 22 and passes through a through hole formed within the base 12 in between notches 16 and 18. Pivot pin 24 permits pivoting movement of the lid 14 relative to the base 12 from the closed position shown in FIG. 3 to the open position shown in FIGS. 1 and 2.

Formed within the operating surface 26 of the base 12 is a pog receiving chamber 28. This pog receiving chamber 28 comprises a circular depression, the bottom surface of which is covered by a resilient layer 30. Resilient layer 30 will normally comprise a rubber or rubber type of material generally no more than an eighth or a quarter inch in thickness. The circular depression of chamber 28 may take another shape such as octagonal, square, et cetera.

The lid 14 includes an operating surface 32. Included within the operating surface 32 is an enlarged circular recess 34. Formed within the lid 14 on opposite sides thereof are slots 36. A thin sheet of paper, referred to as a pattern sheet 38, can be conducted through one notch 36 across the recess 34 and out through the opposite notch 36. This pattern sheet 38 is to include some indicia 40 on its outer surface.

Concentrically disposed within the recess 34 and being of a smaller diameter than recess 34 is a cutting blade 42. The diameter of this cutting blade 42 is equal to the diameter of the pog receiving chamber 28. Mounted across the cutting blade 42 is a transparent window 44. The transparent window 44 is part of the lid 14. Mounted on the operating surface 32 are a pair of foot pads 46. The foot pads 46 are to come into contact with the operating surface 26 of the base 12.

Figure 1:
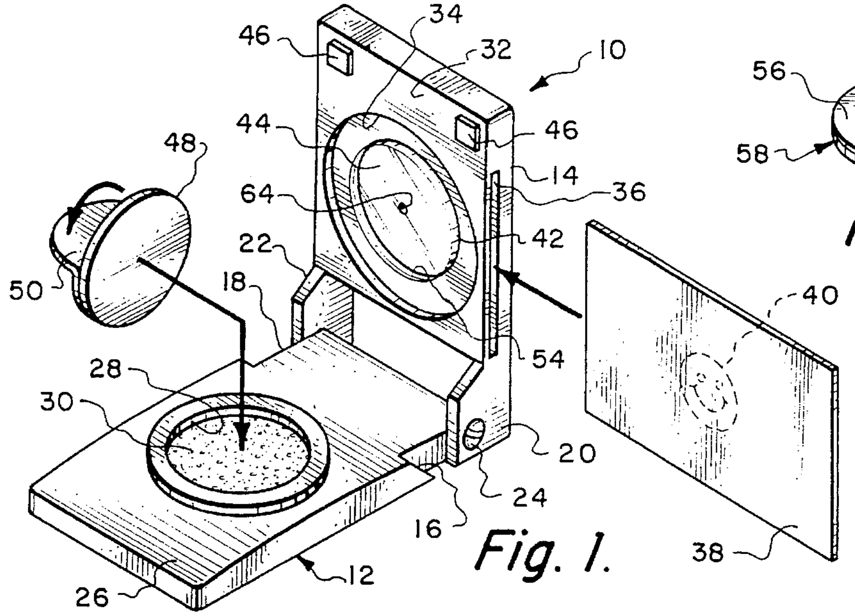
FIG. 1 is an isometric view of the pog press of the present invention showing the pog press at an open position depicting connection of the pog receiving chamber with a blank pog and the pog receiving pocket with a sheet material pattern.
Figure 5:
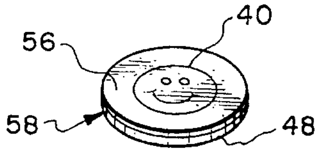
FIG. 5 is an isometric view of the custom made pog which has been formed utilizing the pog press of the present invention.

With the pog press 10 in the open position as shown in FIG. 1, the user takes a blank pog 48 and removes release layer 50 exposing adhesive layer 52. The user then inserts the pattern sheet 38 through the slots 36 and aligns indicia 40 centrally within the pog pocket 54 formed by the circular enclosing cutting blade 42. The user then closes the pog press 10 to the position shown in FIG. 3 and presses tightly together the lid 14 and the base 12 which will cause the cutting blade 42 to severe pattern sheet 38 producing a circular layer 56 which is precisely the same size as the pog 48. Tightly pressing together of the lid 14 and the base 12 will result in this circular layer 56 being tightly adhesively bound by adhesive layer 52 onto the finished pog 58. The user then lifts the lid 14 to the open position shown in FIGS. 1 and 2, removes the pog 58 from the pog receiving chamber 28 and the pog 58 is now ready to be used as desired. At times, the pog 58 will be stuck in the pog pocket without cutting blade 42. To remove the pog 58 a hole 64 is provided in window 44. Hole 64 permits insertion of a tool to dislodge pog 58 from the pog pocket.

The exterior surface of the lid 14 includes a circular depression 60 which connects with the transparent window 44. The transparent window 44 is securely held in place in conjunction with the lid 14 by means of adhesive 62. It is to be understood that the pog press 10 of this invention can be reused again and again to produce customized pogs 58.

What is claimed is:

1. A pog press comprising:

a base, said base having a pog receiving chamber;

a lid movably mounted in conjunction with said base, said lid having a pog pocket, said pog pocket adapted to receive a pog sheet material layer, said pog pocket to connect with said pog receiving chamber forming a totally enclosed pressing chamber;

said lid being pivotally mounted on said base, said lid being movable from a closed position to an open position, when in said open position said pog pocket being spaced from said pog receiving chamber, when in said closed position said pog pocket engaging with said pog receiving chamber forming said totally enclosed pressing chamber; and said pog receiving chamber including a resilient bottom surface which covers entirely said pog receiving chamber, said resilient bottom surface being slightly compressible formed of a rubber material.

2. The pog press as defined in claim 1 wherein:

said lid including a pattern receiving slot connecting with said pog pocket, said pattern receiving slot to connect with a sheet material pattern completely covering said pog pocket, said sheet material pattern to be located within said pog receiving chamber when said lid is in said closed position.

3. The pog press as defined in claim 2 wherein:

a cutting blade mounted on said lid, said cutting blade surrounding said pog pocket, whereby pressing together said lid and said base will cause said cutting blade to sever said sheet material pattern.

4. A pog press comprising:

a base, said base having a pog receiving chamber;

a lid movably mounted in conjunction with said base, said lid having a pog pocket, said pog pocket adapted to receive a pog sheet material layer, said pog pocket to connect with said pog receiving chamber forming a totally enclosed pressing chamber;

said pog pocket including a transparent window, said transparent window permitting visual observation of said pog pocket from the exterior of said pog press; and said window having a hole, said hole adapted to connect with a tool to remove a custom made pog from said pog pocket.

* * * * *